Figure 1:
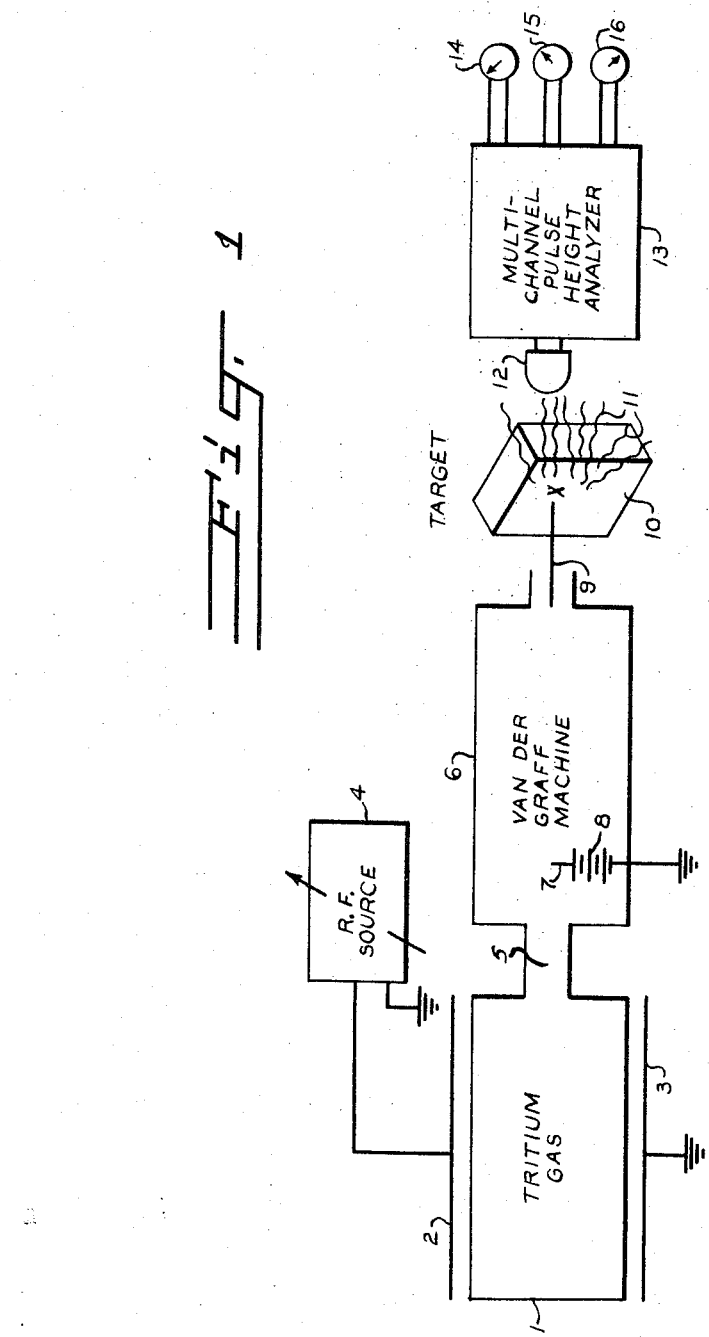

Feb. 3, 1959  G. E. OWEN  2,872,583
HYDROGEN CONTENT ANALYSIS
Filed June 5, 1956

INVENTOR.
George B. Owen
BY
Howard L. Rose
Attorney.

United States Patent Office 2,872,583
Patented Feb. 3, 1959

2,872,583

HYDROGEN CONTENT ANALYSIS

George E. Owen, Baltimore, Md., assignor to Nuclear Corporation of America, Inc., New York, N. Y., a corporation of Michigan Application June 5, 1956, Serial No. 589,531

5 Claims. (Cl. 250—43.5)

The present invention relates to methods of determining the hydrogen content of substances and, more particularly, to a method of determining the hydrogen content of substances which is equally applicable to the quantitative determination of the free hydrogen content of a specimen having physically or chemically entrapped hydrogen and to the determination of the hydrogen content of hydrogen compounds.

In accordance with the method of the present invention, a hydrogen compound or a specimen containing physically or chemically entrapped hydrogen is bombarded with tritons and a quantitative determination is made of the rate of characteristic gamma ray emissions resulting from the interaction of the tritons with the hydrogen nuclei. A triton is the nucleus of a tritium atom which is a hydrogen isotope of mass number 3, the triton having a positive charge of unity. Tritons may be produced from tritium gas by subjecting the tritium gas to a radio frequency electrostatic field, or electron bombardment to ionize the tritium and produce tritons and electrons. Tritons, being charged particles, may be formed into a concentrated beam and accelerated by conventional apparatus such as a Van der Graff machine. The concentrated beam of tritons is employed to bombard the substance containing hydrogen, the tritons uniting within; that is, being captured by the hydrogen nuclei to form highly excited nuclei of helium 4. The highly excited nuclei of helium 4 are unstable due to their excess energy and emit characteristic gamma rays having an energy of 23 m. e. v. The nuclear reaction or transmutation occurs in accordance with the equation $$_1H^3 + {_1H^1} \rightarrow {_2He^4} + \lambda$$

wherein $_1H^3$ is a triton, $_1H^1$ is a hydrogen atom, $_2He^4$ is a helium atom, and $\lambda$ represents the emitted gamma ray.

The rate of gamma ray emission is dependent upon the number of triton-hydrogen nuclear reactions which is a function of the energy of the bombarding tritons, the number of tritons in the beam and the number of hydrogen atoms in the substance being bombarded. The energy of the tritons may be determined and fixed by adjustment of the triton accelerator and the number of tritons in the beam may be determined and fixed by adjustment of the intensity of the R. F. field applied across the tritium gas. Consequently, the number of triton-hydrogen interactions is a direct function of the number of hydrogen atoms contained in the substance under investigation and since the rate of gamma ray emissions is a function of the number of triton-hydrogen reactions, the hydrogen content of the substance being investigated may be determined by measuring the rate of gamma ray emission.

An important feature of the method of the present invention is that it is equally applicable to the determination of the hydrogen content of a hydrogen compound or a substance containing physically or chemically entrapped hydrogen regardless of whether the substance is in the solid, liquidous or gaseous state. The method is not restricted to the determination of the hydrogen content of some other substance but may be employed to determine the density of pure hydrogen. Irrespective of the chemical or physical status of the hydrogen, the capture of the triton by the hydrogen nucleus is unaffected occurring, as it does, at the nuclear particle level. The previously available procedures of determining the hydrogen content of substances are time consuming and involved and are particularly unsuitable for use in metal fabrication processes where the hydrogen content of the metal must be maintained within predetermined limits. In the manufacture of structural titanium, the hydrogen content of the titanium must be at least 50 parts per million to impart strength to the metal but must be no greater than approximately 250 parts per million since above this ratio the titanium becomes embrittled. The method of the present invention provides for the rapid determination of the hydrogen-titanium ratio and results in little loss of time in the manufacturing process. The delay resulting from this determination may be substantially eliminated by employing the method of the present invention for direct process control thereby completely eliminating the human factor.

An important feature of the method of the present invention is the ability to distinguish between the radiations produced by the triton-hydrogen reaction and radiations produced by other elements or substances with which the hydrogen is compounded or mixed. The energy of the gamma rays resulting from the triton-hydrogen reaction is 23 m. e. v. regardless of the energy of the bombarding triton, the triton energies at which the reaction occurs ranging from practically zero to the maximum energies obtainable and effecting only the rate of gamma ray emission. Whereas the interaction between tritons and hydrogen produces characteristic 23 m. e. v. gamma rays, the nuclear interaction between tritons and any other element produces a continuous energy spectrum of gamma rays; that is, gamma rays are produced at substantially equal rates throughout a large range of energies including 23 m. e. v., provided that the incident energy is sufficiently great to excite the nucleus of the other elements present. The continuous energy spectrum of gamma rays thus produced contstitutes background clutter and the unique 23 m. e. v. gamma rays generated by the triton-hydrogen reaction may be readily distinguished from the background clutter by conventional radiation detection instruments. Such an instrument is the Model 520, 20 Channel Pulse Height Discriminator sold by Atomic Instrument Co. of Cambridge, Massachusetts, which simultaneously records the gamma ray emissions occurring at each of a plurality of distinct energy levels. Where gamma rays are emitted simultaneously as a result of a triton-hydrogen reaction and a reaction between tritons and other elements, each of the indications for energies other than 23 m. e. v. will be of equal magnitudes and the indication for 23 m. e. v. emissions will be greater than the indications for the other energies by an amount equal to the 23 m. e. v. emissions resulting from the triton-hydrogen reaction. For example, if a hydrogen free substance is bombarded with tritons of sufficient energy, a continuous energy spectrum of gamma rays is produced, the amplitudes of the indications for all energies, including 23 m. e. v., being substantially equal. If hydrogen is now added to the substance only the indication relating to 23 m. e. v. gamma rays will increase and it will increase by an amount proportion to the quantity of hydrogen added to the material.

The apparatus required for performing the method of the present invention may take many forms depending upon the source of tritons, the energy of the tritons desired and the like. One such equipment which employs conventional and commercially available apparatus includes a source of R. F. energy applied to parallel plates of a capacitor between which is disposed a container of tritium gas. The R. F. electric field ionizes the tritium to produce positively charged tritons and electrons. A negatively charged electrode draws the tritons into a Van der Graff machine which columnates the tritons into a beam and accelerates them toward the target; that is, the substance under investigation. The gamma rays resulting from the nuclear reactions are detected by a conventional detector, such as a scintillation detector or an ionization chamber and the output voltage of the detector is coupled to an indicating instrument which may be the Model 520 of the Atomic Instrument Company, referred to previously. In the event that the triton energies employed are insufficient to produce nuclear reactions between the tritons and the nucleus of other elements, the multichannel pulse height discriminator may be replaced with a direct reading indicator calibrated to indicate hydrogen content.

It is an object of the present invention to provide a method of determining the hydrogen content of a specimen which is equally applicable to hydrogen compounds, to substances containing physically and chemically entrapped hydrogen and to pure hydrogen.

It is another object of the present invention to provide a method for determining the hydrogen content of a substance by bombarding the substance with tritons and quantitatively measuring the gamma rays emitted as a result of the triton-hydrogen reaction.

It is yet another object of the present invention to provide a method of determining the hydrogen content of a substance by bombarding the substance with tritons and quantitatively determining the 23 m. e. v. gamma rays emitted as a result of triton-hydrogen nuclear reactions.

It is still another object of the present invention to provide a nuclear transmutation method for determining the hydrogen content of a substance which method may be practiced with conventional and readily available apparatus.

It is another object of the present invention to provide a method for the quantitative analysis of the hydrogen content of substances by bombarding the substances with tritons to produce triton-hydrogen nuclear reactions and determining the rate of emission of 23 m. e. v. gamma rays resulting from the triton-hydrogen reactions only.

It is yet another object of the present invention to determine the hydrogen content of a titanium specimen by bombarding the specimen with tritons and quantitatively determining the emitted gamma rays having energies of 23 m. e. v.

The above and still further features, objects and advantages of the invention will become apparent upon consideration of the following detailed description of a specific embodiment of the apparatus employed in practicing the method of the present invention, wherein:

The single figure of the accompanying drawing is a partial block and a partial schematic wiring diagram of the apparatus.

Referring specifically to the figure of the accompanying drawing, a container 1 of tritium gas is disposed between conductive plates 2 and 3. A variable source 4 of R. F. energy is connected to apply an R. F. voltage across the plates 2 and 3 so as to establish a high frequency electric field across the container 1. The motion imparted to the electrons by the electric field produces multiple collisions between the electrons and the atoms of the tritium gas, ionizing the gas and producing positively charged tritons and electrons. The voltage output of the source 4 may be varied so as to control the number of collisions between the electrons and the tritium gas to thereby establish a fixed rate of triton production.

The container 1 is connected via a short pipe 5 to a Van der Graff machine 6, the positively charged tritons being attracted to the machine 6 by a negatively charged probe 7 connected to a source 8 of negative voltage. The Van der Graff machine 6 columnates the tritons into an accelerated beam 9 directed towards a target 10, the energies of the tritons being determined and fixed during each analysis. The target 10 may be a substance containing hydrogen as a free element or as a constituent of a chemical compound. Although the target 10 is illustrated as a solid substance it is to be understood that the target may also be a cell containing a substance in the liquidous or gaseous state. The tritons unite with the nuclei of the hydrogen atoms for forming highly excited helium 4 nuclei which due to their excess energy emit 23 m. e. v. gamma rays generally designated by the reference numeral 11. Interactions may also occur between the tritons and the nuclei of other elements in the target 10 resulting in the production of further gamma rays having a continuous energy spectrum, the further gamma rays also being designated by the reference numeral 11. A portion of the total gamma ray emission is intercepted by a conventional detector 12 such as a scintillation counter or a Geiger-Mueller tube and the output voltage of the detector 12 is coupled to a multichannel pulse height analyzer 13. The output voltage of each channel may be coupled to a distinct visual indicator only three of which are illustrated and these being designated by the reference numerals 14, 15 and 16. The detector 12 produces output voltage pulses, the amplitudes thereof being dependent upon the energies of the incident gamma rays and the rate of generation of the pulses of various heights being dependent upon the rate at which the gamma rays of various energies are intercepted by the detector 12. The output pulses from the detector 12 are coupled to the analyzer 13, the pulses of the same height proceeding through a common channel and the pulses of different heights proceeding through different channels of the analyzer 13. Each channel actuates a distinct visual indicator 14, 15 or 16, each indicator providing a visual display indicative of the rate at which its associated channel receives pulses. Thus each of the indicators 14, 15 and 16 provides an indication of the rate of generation of gamma rays in a distinct energy range.

The rate of production of gamma rays is dependent upon three factors, to wit, the average number of tritons in the beam 9, the energy of the tritons in the beam and the quantity or concentration of the hydrogen or other element with which the tritons react in the target 10. The number and energy of tritons in the beam 9 may be determined respectively by appropriate control of the R. F. source 4 and the Van der Graff machine 6 and, consequently, the rate of production of gamma rays 11 is directly proportioned to the quantity of the elements in the target 10 interacting with the tritons. The nuclear reaction between triton and hydrogen produces gamma rays having a characteristic energy of 23 m. e. v. while the interaction between tritons and the nuclei of other elements produces gamma rays having a continuous spectrum of energies or discrete energies considerably less than 23 m. e. v. Consequently, the latter reactions produce equal indications on all of the indicators 14, 15 and 16 whereas the triton-hydrogen reaction effects the indication of the one indicator, for instance indicator 15, connected to receive the output voltage of the channel of the analyzer 13 which passes pulses indicative of gamma rays having energies of 23 m. e. v. The rate of production of gamma rays having energies of 23 m. e. v. may be readily determined by subtracting the reading of either of the indicators 14 or 16 from the reading on the indicator 15. In the event that the method is to be employed under circumstances where no other reaction than the triton-hydrogen reaction occurs, the analyzer 13 may be replaced by a conventional amplifier circuit the output voltage of which is applied to a single indicator.

The apparatus which may be employed in the practice of the present invention is not limited to that illustrated in the accompanying drawing and other apparatus may be employed within the scope of the present invention. The source of tritons may be a natural source and the Van der Graff generator may be replaced by a cyclotron or other well-known charged-particle acceleration. Regardless of the form of the aparatus employed, the method of the present invention provides a rapid procedure for accurately determining the hydrogen content of various specimens.

While I have described a specific embodiment of the method of the present invention, it will be clear that modifications and variations in the specific steps may be resorted to without departing from the true spirit of the invention as defined in the appended claims.

What I claim is:

1. A method for quantitatively determining the hydrogen content of a specimen comprising the steps of bombarding the specimen with tritons at a predetermined average rate and having a predetermined average energy content and quantitatively determining the rate of generation of gamma rays having energies of approximately 23 m. e. v.

2. A method for quantitatively determining the hydrogen content of a titanium specimen comprising the steps of bombarding the specimen with tritons at a predetermined average rate and having a predetermined average energy content and quantitatively determining the rate of generation of gamma rays having energies of 23 m. e. v.

3. A method for quantitatively determining the hydrogen content of a specimen comprising, generating at a predetermined average rate tritons, forming and directing a beam of tritons of known energy content toward the specimen, and determining the difference between the rate of generation of gamma rays having energies of 23 m. e. v. and the rate of generation of gamma rays having energies other than 23 m. e. v.

4. A method for quantitatively determining the hydrogen content of a specimen comprising the steps of bombarding the specimen with tritons at a predetermined average rate and having a predetermined average energy content and determining the difference between the rate of generation of gamma rays having energies of approximately 23 m. e. v. and the rate of generation of gamma rays having energies other than 23 m. e. v.

5. A method for quantitatively determining the hydrogen content of a specimen comprising generating tritons at a predetermined average rate, forming the tritons into a beam of known average energy content directed toward the specimen and determining the rate of generation of gamma rays having energies of approximately 23 m. e. v.

No references cited.